(12) United States Patent
McGrew

(10) Patent No.: US 6,535,638 B2
(45) Date of Patent: Mar. 18, 2003

(54) METHOD AND APPARATUS FOR READING AND VERIFYING HOLOGRAMS

(76) Inventor: Stephen P. McGrew, 9715 W. Sunset Hwy., Spokane, WA (US) 99224

(*) Notice: Subject to any disclaimer, the term of this patent is extended or adjusted under 35 U.S.C. 154(b) by 0 days.

(21) Appl. No.: 09/881,409

(22) Filed: Jun. 13, 2001

(65) Prior Publication Data

US 2002/0031266 A1 Mar. 14, 2002

Related U.S. Application Data

(63) Continuation of application No. 09/224,260, filed on Dec. 31, 1998.

(51) Int. Cl.$^7$ .................................................. G06K 9/76
(52) U.S. Cl. ......................................... 382/210; 350/226
(58) Field of Search ................................ 382/124, 210, 382/208, 209, 217; 356/71, 450; 350/226; 235/462, 472, 459

(56) References Cited

U.S. PATENT DOCUMENTS

| | | | | |
|---|---|---|---|---|
| 4,543,660 A | * | 9/1985 | Meada | 382/218 |
| 4,641,017 A | | 2/1987 | Lopata | 235/457 |
| 5,339,305 A | | 8/1994 | Curtis et al. | 369/112 |
| 5,756,981 A | * | 5/1998 | Roustaei et al. | 235/462 |
| 5,933,823 A | | 8/1999 | Cullen et al. | 707/6 |
| 6,166,853 A | * | 12/2000 | Sapia et al. | 359/559 |

FOREIGN PATENT DOCUMENTS

| | | |
|---|---|---|
| EP | 0 549 990 A1 | 7/1993 |
| EP | 0 878 780 A2 | 11/1998 |
| JP | 07302338 | 11/1995 |

\* cited by examiner

*Primary Examiner*—Jayanti K. Patel
*Assistant Examiner*—Seyed Azarian
(74) *Attorney, Agent, or Firm*—Dorsey & Whitney LLP

(57) ABSTRACT

A system and method for reading the information stored in holograms and other diffractive objects. The information is read by analyzing the diffraction pattern produced when a laser beam is focused onto a small spot on the object and scanned across the object.

37 Claims, 6 Drawing Sheets

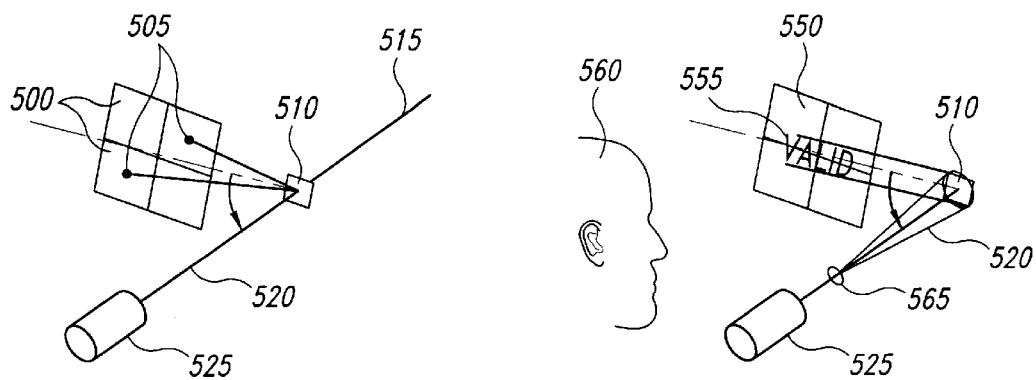
Fig. 1A
(Prior Art)
Fig. 1B
(Prior Art)
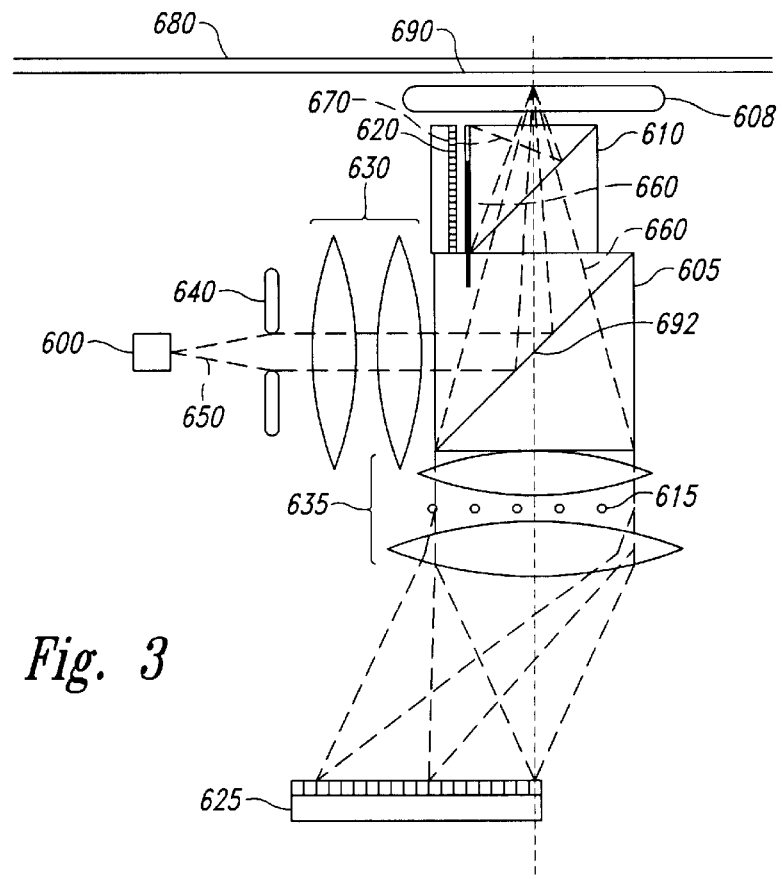
Fig. 3

METHOD AND APPARATUS FOR READING AND VERIFYING HOLOGRAMS

CROSS-REFERENCE TO RELATED APPLICATIONS

The present application is related to the inventor's U.S. patent application Ser. No. 09/224,938 entitled QUANTUM DOT SECURITY DEVICE AND METHOD, filed Dec. 31, 1998, the disclosure of which is incorporated herein by reference.

CROSS-REFERENCE TO RELATED APPLICATION

This application is a continuation of pending U.S. patent application Ser. No. 09/224,260, filed Dec. 31, 1998.

TECHNICAL FIELD

This invention relates to holography, and, more particularly, to a hologram reader/verifier.

BACKGROUND OF THE INVENTION

Prior art hologram readers have depended on the use of holograms having a special format or special characteristics. Examples of prior art hologram readers are illustrated in FIGS. 1a and 1b. In the hologram reader of FIG. 1a, a holographic bar code is illuminated by a laser beam 520 that is generated by a laser 525. A pattern of spots 505 is then reconstructed onto a set of photodetectors 500 positioned specifically to detect spots at particular positions.

In the hologram reader of FIG. 1b, a hologram 510 containing a non-focused image recording is illuminated by a laser beam 520 that is generated by a laser 525. The laser beam 520 is incident at its reference (or conjugate reference) angle to reconstruct an image 555 onto a ground glass screen 550, where it can be seen by a human observer 560.

Another type of prior art hologram reader (not shown) does not actually read a hologram but instead compares a wavefront recorded in a hologram to a reference wavefront. Yet another type of prior art hologram reader (not shown) simply compares a single 2-D view of the hologram to a stored 2-D reference image.

U.S. Pat. No. 4,641,017 to Lopata, entitled Fraud Resistant Credit Card System

U.S. Pat. No. 5,331,443 to Stanisci, entitled Laser Engraved Verification Hologram And Associated Methods U.S. Pat. No. 4,761,543 to Hayden et al., entitled, Holographic Security Devices And Systems U.S. Pat. No. 4,108,367 to Hannan, entitled Token And Reader For Vending Machines U.S. Pat. No. 5,712,731 to Drinkwater et al., entitled Security Device For Security Documents Such As Bank Notes And Credit Cards U.S. Pat. No. 5,306,899 to Marom, et al., entitled Authentication System For An Item Having A Holographic Display Using A Holographic Record U.S. Pat. No. 4,131,337 to Moraw, et al., entitled Comparison Reader For Holographic Identification Cards U.S. Pat. No. 3,905,019 to Aoki, et al., entitled Pattern Recognizing Optical Apparatus U.S. Pat. No. 5,666,417 to Liang, et al., entitled Fluorescence Authentication Reader With Coaxial Optics U.S. Pat. No. 5,465,243 to Boardman, et al., entitled Optical Recorder And Reader Of Data On Light Sensitive Media U.S. Pat. No. RE 035,117 to Rando, et al., entitled Scanner With Coupon Validation The prior art hologram readers described above and in the above-listed patents are capable of reading holograms only if the holograms are specially adapted for the reader. There is therefore a need for a hologram reader that is capable of reading all kinds of holograms without the need for the holograms to be specially adapted for the reader and is capable of reading variable information from holograms.

BRIEF DESCRIPTION OF THE DRAWINGS

FIG. 1a is a schematic drawing showing a prior art hologram reader.

FIG. 1b is a schematic drawing showing another prior art hologram reader.

FIG. 3 is a schematic drawing of one embodiment of a hologram reader in accordance with the present invention.

DETAILED DESCRIPTION OF THE INVENTION

Figure 2A:
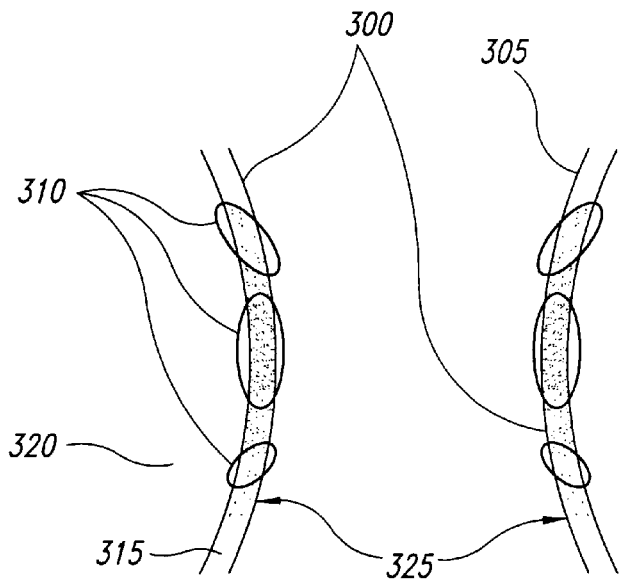
FIG. 2a is a schematic drawing of a diffraction pattern typical of a rainbow hologram illuminated at a point using a perpendicular beam.

FIG. 2a illustrates the diffraction pattern typically obtained from a reflective "rainbow" hologram 300 when an illumination beam (not shown) is incident perpendicular to the surface of the hologram 300. The illumination beam incident at an angle corresponding to a reference beam (not shown) angle used to make the hologram 300 will produce a first-order diffracted beam that forms a straight line segment instead of an arc. Inside a first-order arc as shown in FIG. 2a are "blobs" 310 of light that relate to the features of the image that would be visible through an illuminated point on the hologram 300. In order to read a rainbow hologram, it is only necessary to identify and track these, blobs 310 as the point of illumination is moved to all salient points on the hologram 300. For example, the salient points on a hologram can be defined as those points on a line through the hologram 300, parallel to an edge of a card or label the hologram is on, and a predetermined distance from the edge.

Figure 2B:
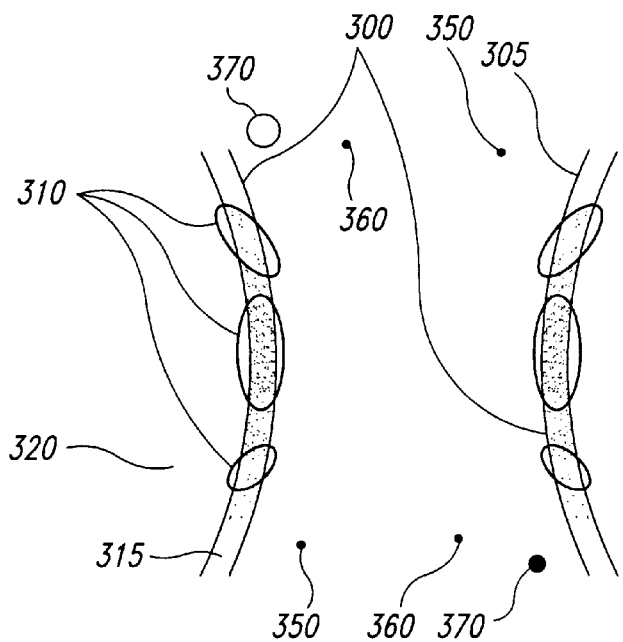
FIG. 2b is a schematic drawing of a diffraction pattern typical of a complex hologram containing both diffraction grating components and rainbow hologram components.

FIG. 2b illustrates a diffraction pattern 320 obtained from a combined rainbow hologram and diffraction grating image. Small spots 350. 360, 370 formed on the pattern correspond to regions containing diffraction gratings, while lines or arcs 315 correspond to regions containing rainbow hologram components or "2D" hologram components. If the lines or arcs 315 contain blobs 310, the corresponding hologram component is usually a 3D hologram. If the lines or arcs 315 contain only a substantially featureless or uniform distribution of light, the corresponding hologram component is a "2D" hologram.

While standard image processing techniques can be used to identify the size, shape and location of each blob 310, it is helpful to take advantage of properties specific to holograms in order to simplify the feature detection and identification task. Unless holograms are blazed, they produce diffraction patterns that are approximately radially symmetric, as are the spots 360 shown in FIG. 2b. However, if the holograms are blazed, the positions of the +1 and –1 orders are symmetrical but the brightness of one is substantially higher than that of the other, as are the spots 370 shown in FIG. 2b.

For a hologram reader to be able to distinguish between different holograms, certain features of the holograms are important. These features include spot location, blob location, blob asymmetry, blob size, blob shape, blob velocity, blob envelope, and stray light, each of which are discussed below.

The location of a blob can usually be defined as the location of its brightness peak. Alternatively, blob location can be defined as center of mass of the intensity distribution. Radial coordinates are appropriate, since the overall pattern will have a large degree of radial symmetry.

Blob asymmetry can be defined as the ratio of intensities of corresponding blobs in the +1 and –1 orders. Each blob pair will have its own asymmetry.

Blob size can be defined as the maximum width of the region covered by a blob. Coverage in turn can be defined as having an intensity greater than some threshold level determined by the peak intensity of the blob and the background brightness.

In most diffraction patterns from holograms used commercially today, blobs are either point-like or line-like. Line-like blobs occur on the arcs shown in FIG. 2, while point-like blobs occur anywhere in the diffraction pattern. The hologram diffraction pattern shown in FIG. 2b has both kinds of blobs. Other blob shapes are possible, and the image processing software should have the capability of detecting the presence of unusual shapes.

As a hologram is being read by a point of illumination moving across the hologram, the blobs in the diffraction pattern move and change in a piecewise continuous fashion. Blob velocity is the rate-of-change of the blob's location, asymmetry, size and shape in the diffraction pattern with respect to change of location of the illuminated point on the hologram.

In a rainbow hologram, the arc (as seen in FIGS. 2a and 2b) is defined by the limits of the blob boundaries as they move in response to changing location of the illuminated point. The blobs never move outside the boundaries of the arc. The arc itself corresponds to the size and shape of an H-1 hologram used to make the rainbow hologram, or of an aperture through which H-1 light was transmitted on its way to forming an H-2 hologram. The position, curvature and orientation of the arc, then, provide information about the physical apparatus used to make the hologram.

In most holograms, there is stray light in the diffraction pattern. This light forms dim symmetric patterns upon illumination with a normal-incidence beam, but it has no apparent connection with the visible image. Ordinarily these stray diffraction components result from scattered light in the hologram recording apparatus in which the scattered light is recorded as a hologram along with the object light. A common technique of holographers is to illuminate a hologram with laser light and look through it to see an image of the apparatus that was used to record the hologram.

All information recorded in a hologram is extractable via the diffraction pattern produced (e.g., FIGS. 2a and 2b) by the illumination of each point of the hologram. Ordinarily, holograms used in document security are mass-produced from a single original master hologram, and the diffraction patterns are the same for all of the holograms. However, new low-cost hologram recording materials and inexpensive lasers have been developed that have begun to make it practical to produce large numbers of one-off holograms, each containing unique information. In order to read the information in such holograms, it is either necessary to design the holograms to be easy to read (as in the prior art), or to design a reader, such as a reader according to a preferred embodiment of the present invention, that is capable of reading all diffraction patterns produced by points of the hologram.

FIG. 3 illustrates a hologram reader in accordance with one embodiment of the present invention. The hologram reader includes a laser diode 600, focusing optics 630, preferably with aberration correction, a first beamsplitter 605, a color-selective filter 662, an image sensor 620, a time-gated line array sensor 625, spectrum-forming optics 615, 635, and a second beamsplitter 605. The laser diode 600, preferably having the shortest wavelength available, generates a beam 650 that is shaped by the focusing optics 630 to form a converging spherical wave. The converging spherical wave converges to a small spot on a hologram 690, which is hot-stamped onto a credit card 680. A suitable laser diode 600 that may be used as the light source for the hologram reader is a green frequency-doubled laser diode. However, blue laser diodes or UV laser diodes may be preferred as they become commercially available at reasonable cost.

The hologram 690 on the card 680 may be transparent, in which case a relief surface of the hologram 690 is preferably coated with a high-refractive index material (not shown) so that the hologram 690 is significantly bright. Suitable high-refractive index materials include titanium oxide or zinc sulfide. If the hologram 690 is transparent, the surface of the card 680 underneath the hologram 690 may be provided with features detectable through the hologram, such as patterns of fluorescent ink, colored ink, fibers, magnetic inks, or optically variable inks.

In operation, the laser beam 650 diffracts from the hologram 690 to form a pattern on the image sensor 620. The image sensor 620 does not sense the entire image in the hologram. Instead, the image sensor 620 senses the pattern of diffracted light from one illuminated, spot on the hologram 690. The color-selective filter 662 ensures that the image sensor 620 receives only light of the same color as the illuminating laser beam 650, and therefore receives predominantly diffracted, scattered and reflected light. If the illuminating laser beam 650 is directed at an appropriate angle to the hologram 690, corresponding to the angle between reference and object beams (not shown) used in manufacturing the hologram 690, only positive diffracted orders will fall onto the image sensor 620 placed directly above the hologram. Alternatively, the illuminating laser beam 650 may be directed perpendicularly to the hologram 690, as indicated in FIG. 3, thereby enabling the image sensor 620 to receive both positive and negative diffracted orders while placed directly above the hologram 690.

Illumination of fluorescent inks printed on the substrate of the card 680 induces the emission of fluorescent light. This fluorescent light passes through the spectrum-forming optics 615, 635 to the second beamsplitter 605, which directs the fluorescent light onto the time-gated line array sensor 625. The time-gated line array sensor 625 images the spectrum of the fluorescent light. A stop 692 blocks the direct reflection (zero-order diffracted beam) of the illumination laser beam 650 from striking the line array sensor 625.

Fluorescence from different substances has two primary distinguishing features: emission spectrum and temporal behavior. For example, many organic dyes have a very short fluorescence lifetime so that if they are illuminated with a picosecond pulse of excitation light, they emit a brief pulse of fluorescence shorter than a nanosecond. Other fluorescent substances emit fluorescence for hundreds of nanoseconds following excitation. Many materials are fluorescent to some degree, but most have short fluorescence lifetimes; so it is advantageous to use a fluorescent ink with a long fluorescence lifetime, thereby providing the opportunity to exclude background fluorescence by time-gating methods.

In the embodiment illustrated in FIG. 3, the line array sensor 625 is time-gated and the laser diode 600 is pulsed. If the fluorescence lifetime of the fluorophores in the printing on the substrate of the card 680 is longer than typical fluorescence lifetimes of ordinary materials, then by selectively detecting only fluorescent light received more than, say, 100 nanoseconds following the excitation pulse, background fluorescence is effectively excluded.

Figure 4:
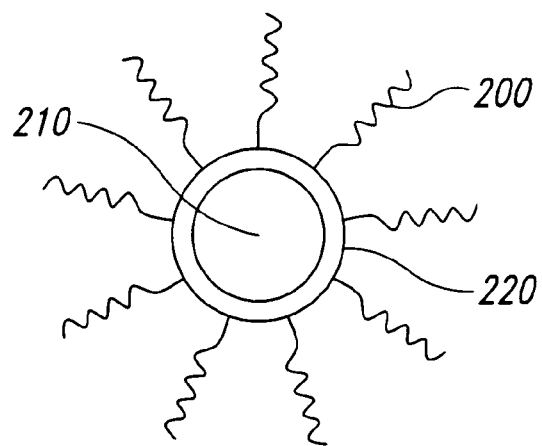
FIG. 4 is a schematic illustration of a typical fluorescent quantum dot including a core and a cap of organic molecules.

One example of a suitable fluorescent material is formed using quantum dots 210, as illustrated in FIG. 4. The quantum dots 210 are preferably composed of CdSe and coated with a cap 220 of ZnSe. Such ZnSe-capped CdSe quantum dots are known to have fluorescence lifetimes on the order of 100 nanoseconds. Alternatively, the line array sensor 625 can simply have a response time on the order of tens or hundreds of nanoseconds, and the laser diode 600 can be modulated at a rate of one to tens of megahertz. The fluorescence lifetime can then be measured as a function of the phase difference between the illumination modulation and the fluorescence signal. In any case, the line array sensor 625 detects the fluorescence spectrum of any ink or other fluorescing substance under the hologram 690 at the illuminated spot.

Figure 5:
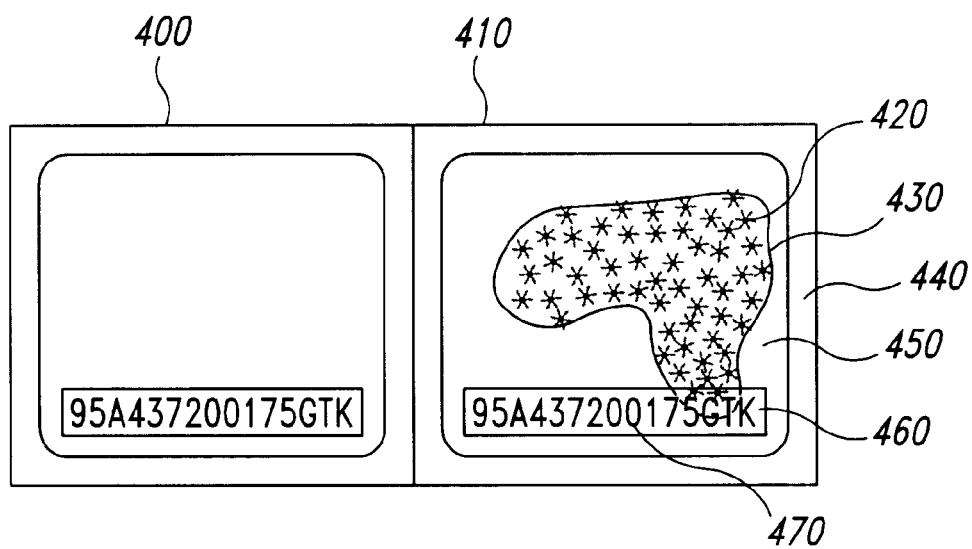
FIG. 5 is a schematic drawing of two representative labels containing a hologram, a fluorescent material, and encrypted data in the form of a character string printed directly onto the labels.

Examples of labels 400, 410 formed by holograms 450 having an underlying fluorescent material 430 are illustrated in FIG. 5. In both cases, the hologram 450 is semi-transparent hot stamping foil applied over a substrate 460, which may be formed by paper. The fluorescent material 430 is preferably printed directly on the substrate 460. The hologram 450 has a void in which encrypted data in the form of a character string 470 is printed directly onto the substrate 460. The labels 400, 410 preferably have an adhesive backing (not shown) and a peel-off protective silicone paper back (not shown).

The fluorescent substance 430 may be a fluorescent ink containing fluorophores. It is advantageous to use a patterned fluorescent substance 430 on the substrate 460 having a distinctive fluorescence spectrum. A suitable fluorescent substance 430 is a fluorescent ink containing fluorophores, such as the ZnS-capped CdSe quantum dots 420 described above. The quantum dots 420 are preferably of specific sizes so that the fluorescence spectra will be relatively narrow. Specific organic dyes such as Rhodamine 6G, which has a distinctive peak fluorescence wavelength, may be used. The fluorescent substance 430 is described in greater detail in co-pending patent application entitled QUANTUM DOT SECURITY DEVICE AND METHOD, filed concurrently herewith, and which is incorporated herein by reference.

The credit card 120 of FIG. 5 is representative of the full class of labels, tags, documents, identification cards, authentication labels, paper currencies, seals, and other items on which a hologram, diffractive image, security label or other security device may be placed. The holograms 690, 450, 140 shown in FIGS. 3, 5 and 6, respectively, are representative of the full class of diffractive images including dot-matrix holograms, 2D3D holograms, stereograms, kinegrams, kineforms, Bragg holograms, embossed holograms, holograms embossed into colored film, holographic hot stamping foils. pixelgrams, electron-beam diffractive patterns, and binary optical patterns. As used herein, the term "substrate" means any surface or substance on which a hologram is placed or held in close proximity to, including any inks, fibers, embossing, chemical treating, magnetic properties, or other properties or features of the surface or substance.

Returning to FIG. 3, the image sensor 620, in addition to sensing the pattern of light diffracted by the hologram 690 or 450, also detects light scattered from the substrate of the card 680 or 460 due to fibers, texture, or other properties of the substrate material. Light diffracted by a hologram 690, 450 typically produces a much higher contrast pattern than light scattered uniformly by, for example, a white substrate. Holograms, however, typically produce distinctive diffraction patterns that can be subtracted from the sensed pattern. Changes in the average intensity of light received by the image sensor 620, with the diffracted patterns subtracted out, correspond to changes in the amount of diffusely scattered light from the substrate due to printed patterns or other light-affecting patterns on the substrate. Thus, the hologram reader shown in FIG. 3 can read holograms, fluorescent patterns, and light scattering or light absorbing patterns, as long as such patterns are evident in light of the wavelength range emitted by the laser diode 600. Although a laser diode 600 is used as the illumination source for the hologram reader of FIG. 3, it will be understood that other light sources may be used, such as any well-collimated (spatially coherent) white light source. In such cases, the diffractive patterns, spots and scattered light will usually be discernible by the image sensor 620.

Components, modules and combinations of components in the optical and electronic subsystems of the reader may be substituted for other equivalent components, modules, and combinations of components may be substituted, with the objectives of sensing the diffracted light pattern from the illuminated spot on the hologram and/or the amount of scattered light from each point on or under the hologram, and/or the amount, timing or spectrum of fluorescence emitted from the hologram or its substrate.

Wavelength-selective filters (not shown) may be inserted in the optical path from the hologram 690 to the image sensor 620 and/or in the optical path from the hologram 690 to the time-gated line array sensor 625. The wavelength-selective filters limit detected light to a desired range of wavelengths. For example, since scattered light and diffracted light are of the same wavelength as the laser diode 650, a filter that is transmissive to the wavelength of the laser diode 650 but reflective or absorptive to other wavelengths may be advantageously inserted between the sensor 620 and beamsplitter 610. Similarly, a filter that is reflective or absorptive to light at the wavelength of the laser diode 650 and transmissive to light in the fluorescence bandwidth of the fluorophores may be inserted between the sensor 625 and beamsplitter 605.

Figure 6:
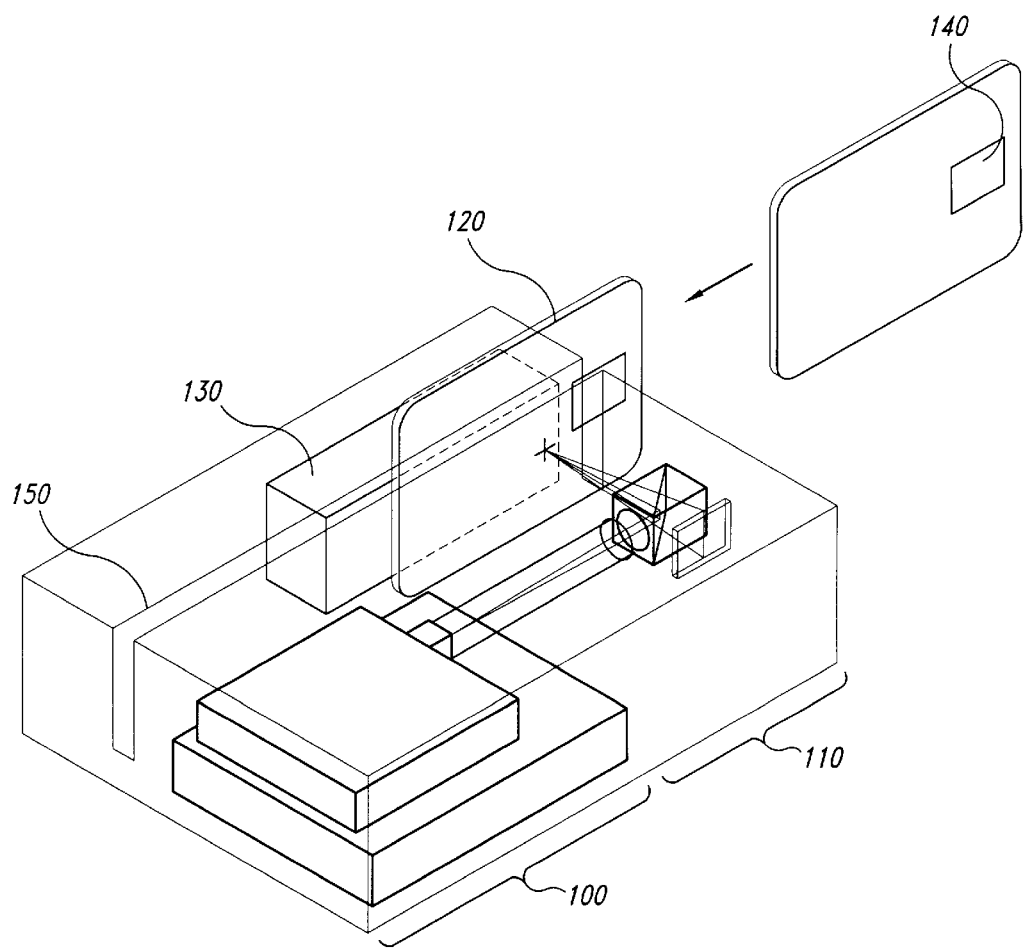
FIG. 6 is a schematic illustration of a credit card verifier, including the hologram reader of FIG. 3, a magnetic stripe reader, and an electronics subsystem.

Alternatively, the beamsplitter 610 may be a polarizing beamsplitter and a quarter-wave plate 608 may be inserted between the beamsplitter 610 and the hologram 690 such that laser light is transmitted nearly 100% at the beamsplitter on its way to the hologram 690, and is also nearly 100% reflected on its way to the image sensor 620. In this case, the beamsplitter 610 may be a wavelength-selective polarizing beamsplitter so that most of the fluorescence light is directed to the line array detector 625, as indicated in FIG. 6.

The hologram reader shown in FIG. 3 may be combined with readers using other technologies. For example, a reader/verifier using multiple technologies is shown in FIG. 6 for use in detecting counterfeit credit cards. In addition to including an optical read head 110, which may be the hologram reader of FIG. 3, the reader/verifier of FIG. 6 includes a conventional magnetic stripe reader 130. The optical read head 110 reads a hologram 140 on a credit card 120, while the magnetic stripe reader 130 reads information recorded on a conventional magnetic stripe (not shown) on the credit card 120 while the credit card 120 slides through a slot 150. The reader/verifier also includes an electronics subsystem 100. The electronics subsystem 100 preferably includes a microprocessor (not shown), a field programmable gate array ("FPGA") (not shown) and a read only memory ("ROM") (not shown), which contains software that is executed by the microprocessor. The electronics subsystem 100 also preferably includes means for communicating with external systems such as a computer (not shown) or telephone network (not shown).

The FPGA in the electronics subsystem 100 is provided to do the image processing. An alternative implementation uses an Artificial Neural Network (ANN). In fact, any image processing means capable of recognizing salient features of a diffraction pattern may be used to distinguish between the diffraction patterns of different holograms and of counterfeit and valid holograms or other diffractive anti-counterfeiting devices known variously as DOVIDs, holograms, stereograms, kineforms, dot-matrix holograms, kinegrams, pixelgrams and so on.

A suitable FPGA that can be used in the electronics subsystem is a model 6216 FPGA available from Xilinx. The FPGA can be programmed to perform almost any desired signal-processing function. For example, the FPGA may be programmed by downloading a configuration file to the FPGA. The configuration file determines the pattern of interconnections among the logic gates on the FPGA. In the case of the Xilinx 6216 FPGA, the FPGA has 128 pins available for input and output, and there are approximately 35,000 logic gates on the FPGA. All of the logic gates can be operated in parallel, synchronously or asynchronously. There are also design tools commercially available for designing the configuration file for the FPGA. A preferred approach in some applications, however, employs evolutionary computation methods to design configuration files. This evolutionary computing approach is within the skills of an individual or team of individuals having ordinary skill in genetic algorithms or genetic programming, FPGA structure and design methods. chip-level electronics and the mathematics of image processing. Alternatively, evolutionary design tools for FPGA configuration files are commercially available from New Light Industries, Ltd., of Spokane, Wash. 99224 under the trade name of "FPGA-Generator"™.

In the preferred embodiment of the invention, an evolutionary technique is used to design FPGA-based algorithms in the electronics subsystem for feature recognition and extraction. In one version, the following steps are carried out:

1. A target function is defined by visually identifying features in a set of diffraction patterns to produce feature-tagged images.
2. A trial function is defined by specifying a matrix to serve as a convolution template.
3. A population of templates is generated randomly, and each member of the population is used to produce a set of convolved images of a training set of images
4. The convolved images produced by each member of the population are compared to the target set of feature-tagged images to produce a fitness value for the member, such that the fitness represents the degree of correspondence between the produced convolved images and the feature-tagged images.
5. Using standard genetic algorithm techniques, the templates are recombined and/or mutated depending on their fitness to evolve an optimum template.

The precise choice of recombination and mutation operators, and the other GA parameters such as recombination rate, mutation rate and size, population size, elitism, etc., can affect the speed at which evolution proceeds. At this time, there is not a known best choice of operators and GA parameters for all classes of problems.

In operation, the reader/verifier of FIG. 6 detects counterfeit credit cards 120 by reading the hologram 140. More specifically, a series of points across the hologram 140 are illuminated as explained above with reference to FIG. 3 as the credit card 120 is drawn through the slot 150. Diffraction patterns from the points are formed on the image sensor 620 where they are converted to video signals. The video signals are analyzed by the electronics subsystem 100 to extract a feature vector corresponding to the values of the significant features of the diffraction patterns in the hologram 140. The feature vector is then compared to a database of feature vectors from valid and invalid holograms, and the hologram 140 is classified according to the similarity of its feature vector to vectors in the database. Data identifying the feature vectors for a valid hologram may also possibly be stored on the magnetic stripe and read by the magnetic stripe reader 130 for comparison with the feature vectors for the hologram 140.

The electronics subsystem 100 may also build a representation of the scattering and fluorescence information extracted from the credit card 120 to determine validity or invalidity of the credit card 120. The optical read head 110 used in the hologram reader of FIG. 6 is thus capable of sensing diffractive properties, fluorescence properties, light scattering properties and light absorptive properties at a point on the credit card 120. If the imaging sensor and/or the line array sensor or the associated electronics are appropriately designed, the reader/verifier can also sense differences between those properties from point-to-point.

A preferred way to build a representation of the diffraction information in the hologram 140 is to detect intensity peaks in the diffraction pattern and generate a list of the locations, sharpness and relative brightness of the peaks. When a series of diffraction patterns are observed at a series of regions across the item, it is advantageous to represent the diffractive properties of the entire item either as a list-of-lists or as a compiled, sorted list.

Figure 7:
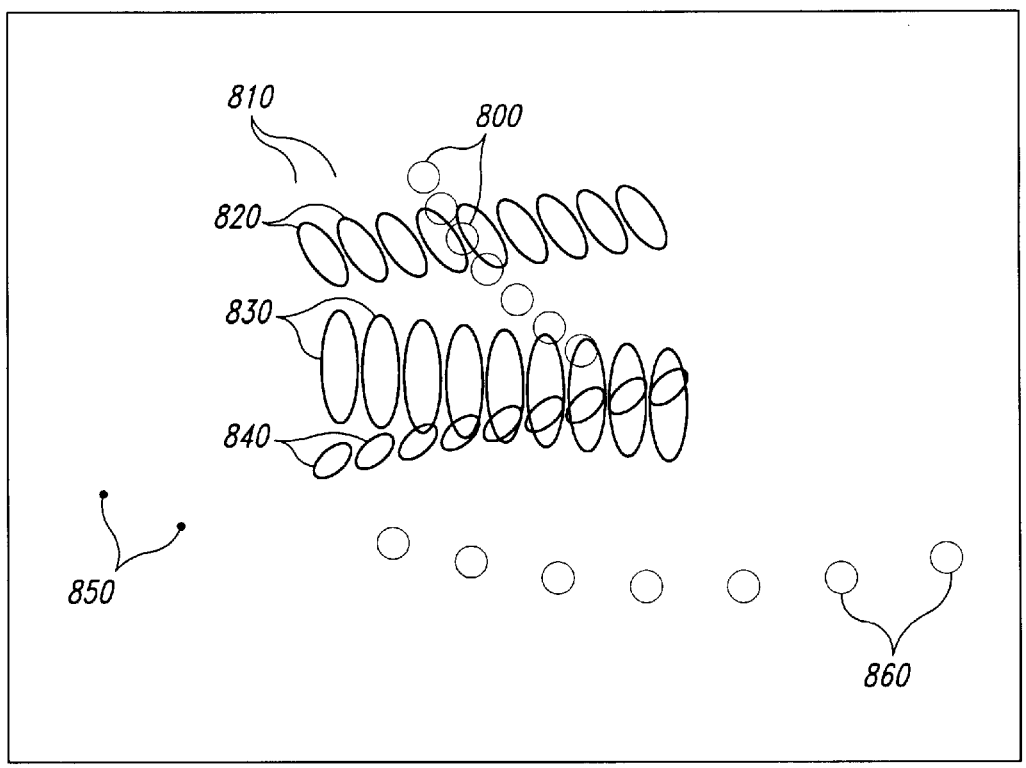
FIG. 7 is a schematic drawing of the type of pattern formed when half of the diffraction pattern from a single point complex hologram is recorded in an image, half of the diffraction pattern from the next single point along a line in the hologram is recorded slightly offset from the first on the same medium, and so on for a series of points along a line across the hologram.

A simple way to represent the diffraction information is to halve the diffraction pattern and save only the position and intensity data obtained from that portion. A representative image of a complete set of diffraction patterns from a line across a hologram is then constructed by stacking the data, as illustrated in FIG. 7. A plurality of blobs 820, 830, 840 then trace paths across the resulting composite image, and any spots 800, 850, 860 from diffraction grating components also trace paths across the resulting composite image. This representative image may then be tested by convolving it with a similarly obtained representative image of each of one or more reference images, which may correspond for example to valid and counterfeit holograms. The paths due to blob and spot motion obtained as in FIG. 7 are substantially invariant with respect to the particular choice of hologram points that are sampled, as long as the scale is essentially unchanged.

As mentioned above, an advantage of the hologram reader illustrated in FIG. 3 is that it can read virtually any type of hologram. Thus a variety of techniques can be used to record holograms that are usable with the hologram reader of FIG. 3. Each of these hologram has its own particular set of characteristics. Some of the characteristics or parameters useful for classifying different kinds of holograms and diffractive images include:

1. recording medium;
2. reference and object beam angles and positions;
3. dot size, shape, spacing, placement, grating angle, and grating period in dot-matrix holograms;
4. rainbow (Benton), classical, 2D3D, stereogram, or dot matrix holograms;
5. transmissive or reflective;
6. reflectivity- enhancing layers;
7. color selectivity of recording medium and Bragg grating structure;
8. color properties of the recording and reconstruction geometry;
9. encoded reference beam or object beam; and
10. features and characteristics of a substrate on which the hologram is laminated or hot-stamped.

Figure 8:
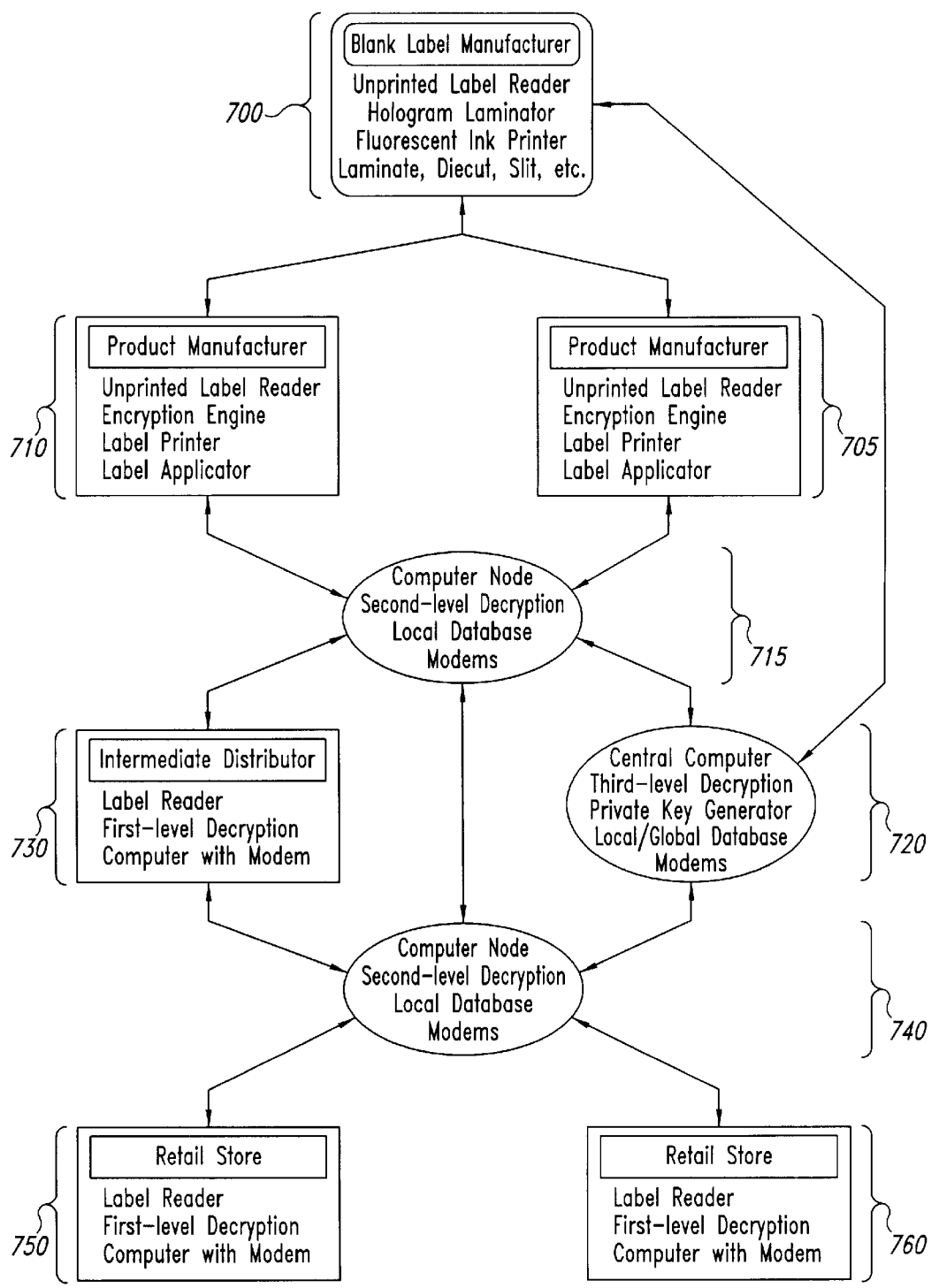
FIG. 8 is a flow chart of a system for using hologram readers and label printers to detect and track counterfeit products.

The hologram reader of FIG. 3 may be integrated into a comprehensive anticounterfeit/security system, as illustrated in FIG. 8. The anticounterfeit/security includes one or more sites 700 for manufacturing anticounterfeit/security labels bearing detectable random data on substrates covered by transparent holograms, one or more manufacturing sites 710, 705 for products, one or more hologram readers at each manufacturing site, label printers at each manufacturing site, one or more intermediate distribution points 730, 720 with hologram readers, one or more distribution endpoints 750, 760 with hologram readers, and a computer network consisting of a hierarchy of nodes 740, 750, 720.

The random data (e.g., in the labels 400, 410 shown in FIG. 5, the locations of fluorescent dots 420 under the holograms 450) are read at the label manufacturing sites 700 and stored in a database. Each hologram printer at the manufacturing sites 700 has associated with it an encryption engine. The encryption engine combines a representation of the random data corresponding to the dots 420 on the labels 400, 410 with private key information securely hidden inside the encryption engine and variable information generated inside the encryption engine to produce an encrypted character string 470 (FIG. 5), which is then printed on the labels 400, 410 by the label printer.

The printed labels are placed on products, which are distributed via intermediate and final distribution points. The labels may be read at the distribution points by hologram readers that are associated with decryption engines. The hologram readers read the random data from the substrates underneath the holograms and use the random data as a public key to decrypt the character string printed on the label, without determining the private key securely hidden in the encryption engine. If a label has been counterfeited or illegitimately produced, either the character string will not be decryptable or the random data will not be contained in the label manufacturer's database.

The term, "character string" is used here inclusively of any encoded information, including bar codes, optically readable alphanumeric characters, encoded magnetic stripes, magnetically readable alphanumeric characters, optically readable bit strings, icons, and the like.

Information relating to the particular labels passing through each distribution point and their validity or invalidity is collected by a network of computer nodes and analyzed at one or more sites. A central computer node may download information to the distribution sites to alert them to particular counterfeiting threats or to upgrade their decryption engines and/or download upgrades to encryption engines to the label printers.

The anticounterfeit/security system illustrated in FIG. 8 is capable of detecting counterfeit products at any point in the manufacturing and distribution flow, and can also collect and analyze product flow. If counterfeits are detected, the temporal and geographic pattern of their appearance can be used to help track down their sources and distribution channels. The system provides the ability to detect factory overruns of labels or products, monitor the number of labels produced, and so on.

It is to be understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A scanner for extracting detailed structural information from a holographic image, comprising:

a laser source constructed to generate a laser beam;

focusing optics that direct the laser beam from the laser source to form an illuminated spot on the holographic image;

an image sensor that detects a pattern of light diffracted from the illuminated spot on the holographic image;

spectrally dispersive optics to form a spectrum line from light received by illuminating a first portion of a substrate over which the holographic image is placed;

a time gated line array sensor that detects the spectrum line formed from the spectrally dispersive optics; and an electronic system that performs image processing functions that include comparing the pattern of light detected by the image sensor to a reference pattern and that compares the spectrum line detected by the time gated line array sensor to a representation of the location of the spectrum line.

2. The scanner of claim 1 wherein the image processing functions include convolving the detected portion of the diffractive pattern with a template pattern to produce a transformed version of the pattern, the transformed version of the pattern identifying peak values of light intensity and representing as vectors, the locations of the peak values in the transformed version of the pattern; and the comparing includes comparing the vectors in the transformed version to a set of reference vectors in a database to classify the vector and thereby to classify a diffraction pattern of the holographic image.

3. The scanner of claim 2 wherein the template pattern is produced by providing a set of training patterns and corresponding target patterns;
an initial set of trial templates is provided to serve as an initial population in a genetic algorithm;
a fitness value is defined, the fitness value being the degree of correspondence between the result of convolving each trial template with each training pattern and corresponding target pattern; and
a genetic algorithm is used with the fitness value for each population of trial templates to evolve the template pattern which, when convolved with every training pattern, produces a convolved pattern that approximates the target pattern.

4. The scanner of claim 1 wherein the illuminating laser beam is directed at the holographic image at an angle corresponding to the angle between reference and object beams used in manufacturing the holographic image and wherein the image sensor detects positive diffracted orders of the illuminated spot.

5. The scanner of claim 1 wherein the laser beam is directed perpendicular to the holographic image and wherein the image sensor detects positive and negative diffracted orders of the illuminated spot.

6. The scanner of claim 1 wherein the illuminated first portion of the substrate includes a fluorescent material and the time-gated sensor detects the spectrum line emitted from the fluorescent material.

7. The scanner of claim 6 wherein the fluorescent material is comprised of a fluorescent organic dye.

8. The scanner of claim 7 wherein the organic dye is rhodamine 6G.

9. The scanner of claim 6 wherein the fluorescent material includes a quantum dot material comprised of CdSe capped with ZnSe.

10. The scanner of claim 6 wherein the laser beam illuminating the spot is pulsed and the time-gated line array sensor is configured to detect fluorescent light emitted from the fluorescent material at a selected period of time after the pulse of the laser beam.

11. The scanner of claim 10 wherein the selected period of time after pulse of the laser beam is greater than about 100 nanoseconds.

12. The scanner of claim 1 further configured to extract and decrypt information stored on a second portion of the substrate, the information on the second portion of the substrate storing the representation for the representation of the spectrum line.

13. The scanner of claim 12 wherein the second portion of the substrate includes alpha numeric characters or a bar code and the scanner includes a character or bar code reader.

14. The scanner of claim 12 wherein the second portion of the substrate includes a magnetic strip and the scanner includes a magnetic strip reader.

15. The scanner of claim 1 wherein the image sensor detects a series of patterns of light diffracted from a series of regions on the holographic image, the series of regions being illuminated by the spot as the holographic image is moved thorough the scanner; and wherein the image processing performed by the electronic system includes comparing the series of patterns of light to a reference series of patterns of light.

16. The scanner of claim 1 wherein the time-gated line array sensor detects a series of spectrum lines, the series of spectrum lines being emitted by the substrate as the diffracted image is moved thorough the scanner; and wherein the image processing performed by the electronic subsystem includes comparing the series of spectrum lines to a representation of the series of spectrum lines.

17. The scanner of claim 16 wherein the image sensor detects a series of patterns of light diffracted from a series of regions on the holographic image, the series of regions being illuminated by the spot as the holographic image is moved thorough the scanner; and wherein the image processing performed by the electronic system includes comparing the series of patterns of light to a reference series of patterns of light.

18. The scanner of claim 17 wherein the reference series of patterns or spectrum lines is represented in the form of a set of parametrized curves.

19. The scanner of claim 18 wherein the reference series of patterns or spectrum lines is represented in the form of a two-dimensional array of values.

20. The scanner of claim 19, wherein the two-dimensional array of values comprise numbers, intensities, vectors, or character strings.

21. The scanner of claim 1 further including means of communicating with an external computer or telephone network linked to a computer, the computer storing the reference diffracted pattern.

22. The scanner of claim 1 wherein the electronic system includes a field programmable gate array and a microprocessor.

23. The scanner of claim 1 wherein the electronic system includes a an artificial neural network.

24. A security label for storing encrypted information comprising;
a transparent or semi-transparent holographic image that produces a series of diffraction patterns as the holographic image is moved through a scanner having a collimated light source that illuminates the holographic image,
a substrate having a first portion over which the holographic image is placed, the first portion of the substrate including a plurality of fluorescent marks that emit a series of spectrum lines when the first portion of the substrate is illuminated by the collimated light as the holographic image is moved through the scanner; and
a second portion of the substrate that stores encrypted information, the encrypted information including a representation for the location of a series of spectrum lines emitted from the fluorescent material relative to the location of a series of patterns of diffracted light, the series of spectrum lines and patterns of diffracted light being produced when the holographic image and substrate having fluorescent marks are moved through the scanner.

25. The security label of claim 24 wherein the fluorescent marks include a material comprising a fluorescent organic dye.

26. The security label of claim 25 wherein the organic dye is rhodamine 6G.

27. The security label of claim 24 wherein the fluorescent marks include a quantum dot material comprised of CdSe capped with ZnSe.

28. The security label of claim 24 wherein the collimated light source is a laser.

29. The security label of claim 24 wherein the second portion of the substrate storing the encrypted information is a magnetic strip.

30. The security label of claim 24 wherein the second portion of the substrate storing the encrypted information includes alpha numeric characters or a bar code.

31. A forensic method for validating a security label having a holographic image and fluorescent marks, comprising:
performing a first scan of a security label at a first site, the label having a holographic image placed over a first portion of a substrate, the first portion of the substrate having a plurality of fluorescent marks disposed thereon;
storing a series of reference patterns on a computer data base, the reference patterns corresponding to features of a series of diffraction patterns generated from a series of regions of the hologram detected when the label is scanned with a collimated light source during the first scan;
detecting the location of the florescent marks relative to the features of the diffraction patterns when the security label is scanned;
encrypting information corresponding to the location of fluorescent marks relative to features of the diffraction patterns determined during the first scan and storing the encrypted information on a second portion of the substrate;
performing a second scan of the label at a second site, the second scan detecting the location of the series of diffraction patterns relative to the fluorescent marks; and
decrypting the encrypted information on the second portion of the substrate to determine whether the location of the fluorescent marks relative the features of the diffraction patterns detected in the second scan corresponds to the location of the fluorescent marks relative the features of the diffraction patterns determined during the first scan.

32. The method of claim 31 further including transmitting information regarding the validity of the labels over a computer network and storing the diffraction patterns detected from the second scan to identify invalid security labels.

33. The method of claim 32 further including tracking the geographic location of invalid labels.

34. The method of claim 31 wherein the decrypted information is stored on the second portion of the security label as alpha numeric characters or a bar code.

35. The method of claim 31 wherein the decrypted information is stored on the second portion of the security label on a magnetic strip.

36. The method of claim 31 wherein the first and second scans are performed using a laser beam as the collimated light source.

37. The method of claim 31 wherein the information from the first scan is encrypted using a first encryption key, and the information is decrypted using a second decryption key.

* * * * *

UNITED STATES PATENT AND TRADEMARK OFFICE
CERTIFICATE OF CORRECTION

PATENT NO.    : 6,535,638 B2
DATED         : March 18, 2003
INVENTOR(S)   : Stephen P. McGrew It is certified that error appears in the above-identified patent and that said Letters Patent is hereby corrected as shown below:

Column 4,
Line 56, "one illuminated, spot" should read -- one illuminated spot --

Column 8,
Line 12, "training set of images" should read -- training set of images. --

Column 11,
Line 64, "thorough" should read -- through --

Column 12,
Lines 4 and 12, "thorough" should read -- through --
Line 31, "includes a an artificial" should read -- includes an artificial --

Signed and Sealed this

Thirtieth Day of December, 2003

JAMES E. ROGAN
*Director of the United States Patent and Trademark Office*